J. Shaefer,
Cider Mill.
Nº 25,050.  Patented Aug. 9, 1859.
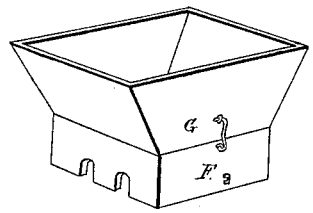
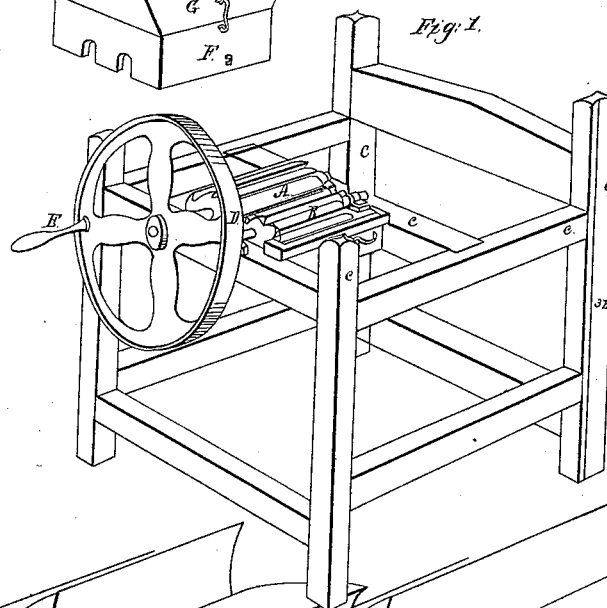
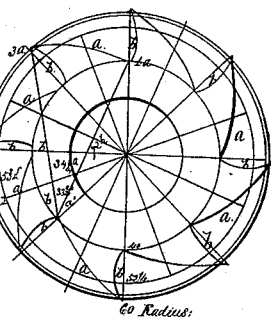
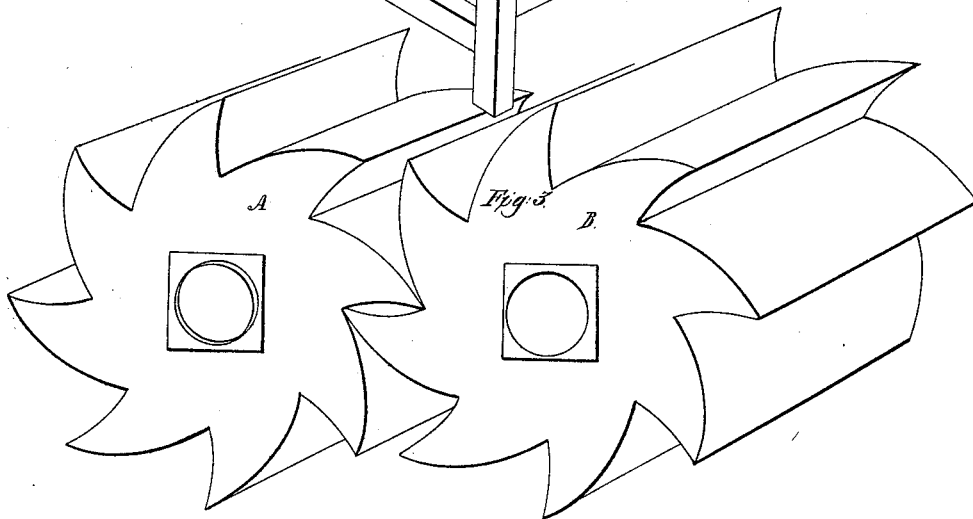
Witnesses:
Jacob Stauffer
S. G. Musser
Inventor:
John Shaefer

UNITED STATES PATENT OFFICE.

JOHN SHAEFER, OF LANCASTER, PENNSYLVANIA.

GRINDING-CYLINDER FOR APPLE-MILLS.

Specification of Letters Patent No. 25,050, dated August 9, 1859.

*To all whom it may concern:*

Be it known that I, JOHN SHAEFER, of the city of Lancaster, in the county of Lancaster and State of Pennsylvania, have invented a new and useful Improvement in Apple-Mills, which consists in furnishing the grinding-cylinders with curved teeth, which have a common tangent at each or all points of contact throughout their entire length, operating as cutting and bruising blades, as well as for cogs or gearing; and I do hereby declare that the following is a full, clear, and exact description of the construction and operation of the same, reference being had to the accompanying drawings, making a part of this specification, in which—

Figure 1, is a perspective view of two such cylinders A, B in position, mounted on a suitable frame work $c$, $c$, with a fly wheel D, and handle E, for which a crank handle, or, strap wheel, may be substituted for imparting motion to A, the box F, and hopper G, Fig. 2, removed. Fig. 3, shows the ends of the toothed cylinders enlarged, and the longitudinal sides in part, in perspective. Fig. 4 illustrates the method employed for obtaining the convex curve $b$, and concave $a$, of each toothed blade.

These cylinders may be of wood, or of cast iron either hollow or solid, mounted in journal boxes, those to A, being made adjustable to regulate the proximity or gearing, having eight such longitudinal teeth to each, for apple mills, of the ordinary size, as shown by Fig. 3. The curvatures of the teeth are obtained by dividing the circle of the circumference into sixteen equal segments of $22\frac{1}{2}°$ each, the base of the teeth forming an octagon at $\frac{2}{3}$ the distance from the center (that is 40, if the radius is 60), on those segments or lines, the radius of the concave curves $b$, and the convex curves $a$, of each tooth will be found, as shown by Fig. 4. The peculiar tangential curves of the teeth on these cylinders, obviate the necessity of other cog-gearing, their cutting edges allowing space for a large sized apple to lodge, which can not escape, and is necessarily cut and effectually bruised into minute divisions, as it passes between the cylinders; and any of the ordinary means may be employed for expressing all the cider in the pulp. The drawing illustrates the cleaning of the teeth, and a large machine or mill beautifully exemplifies the principle as being a decided improvement.

What I claim as my invention and desire to secure by Letters Patent is—

The tangential-curved, longitudinal-toothed, cylinders A, B, as set forth and described.

JOHN SHAEFER.

Witnesses:
S. E. MUSSER,
JACOB STAUFFER.